Aug. 31, 1954 H. E. GOLDSTINE 2,688,074
FREQUENCY CONTROL SYSTEM FOR DIVERSITY TRANSMITTERS
Filed June 15, 1951
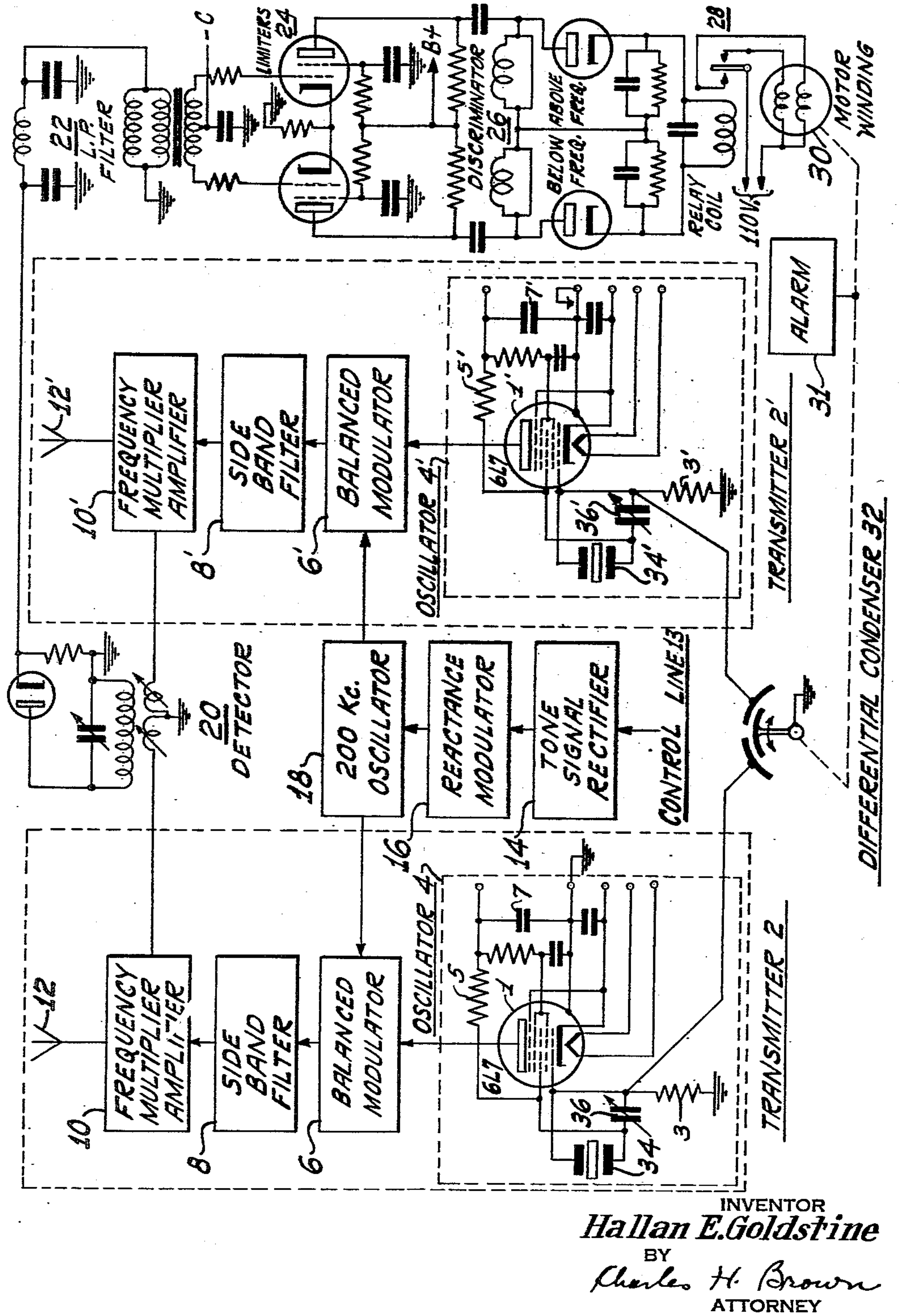
INVENTOR
Hallan E. Goldstine
BY
Charles H. Brown
ATTORNEY Patented Aug. 31, 1954

2,688,074

UNITED STATES PATENT OFFICE 2,688,074

FREQUENCY CONTROL SYSTEM FOR DIVERSITY TRANSMITTERS

Hallan E. Goldstine, Port Jefferson Station, N. Y., assignor to Radio Corporation of America, a corporation of Delaware Application June 15, 1951, Serial No. 231,881

The terminal 15 years of the term of the patent to be granted has been disclaimed 3 Claims. (Cl. 250—17)

This invention relates to frequency control apparatus; and more particularly, to apparatus for automatically maintaining substantially constant the difference in frequency between two radio frequency oscillators.

In radio frequency apparatus it is often necessary to operate two oscillators at different frequencies which differ from one another by a predetermined constant value. This is the case in a diversity transmission communication system which utilizes two radio transmitters operating on nearly the same frequency but on different geographically spaced antennas and wherein the same intelligence is transmitted over both transmitters in order to overcome the effect of fading. If both transmitters are frequency shift keyed simultaneously, that is, keyed by varying the transmitted frequency a small value to correspond to a keying signal, there is great need for maintaining a constant frequency difference between the two outputs from the two transmitters because of the relatively small difference frequency therebetween.

One known way of meeting this difficulty of maintaining the difference frequency constant is to utilize as nearly identical oscillators as possible controlled by piezoelectric crystals having similar temperature coefficients, and to attempt to operate the two oscillators under exactly the same conditions. This method necessitates high original expense to obtain nearly identical piezoelectric crystals, painstaking effort and constant supervision.

An object of the present invention is to automatically maintain substantially constant a small order frequency difference between two oscillators, using inexpensive oscillator components.

The invention is hereinafter described by way of examples only, in connection with an automatic frequency control circuit for a frequency shift keyed diversity transmission system. The outputs from the two radio transmitters are rectified, combined to produce a resulting audio beat frequency, and this beat frequency is fed to an audio discriminator which controls a motor. The motor, in turn, drives a differential condenser to vary the frequencies of the crystal oscillators of the two transmitters differentially, in such manner as to maintain a fixed frequency difference between them. The frequencies of the oscillators are made to vary in response to the change of their beat frequency from a predetermined value, the oscillators being varied in opposite directions to minimize the variations of the average frequency of the two oscillators from a predetermined value.

Other objects, features, and advantages will appear in the subsequent detailed description which is accompanied by a drawing, wherein the sole figure illustrates a radio transmitting system embodying the invention.

Referring to the figure there is shown a frequency shift keyed diversity transmission system employing two transmitters 2 and 2′. Transmitter 2 includes a piezoelectric crystal oscillator 4, a balanced modulator 6, a side band filter 8, a frequency multiplier-amplifier 10, and antenna 12 coupled to the multiplier-amplifier to radiate the energy generated. Transmitter 2′ is similar to transmitter 2, corresponding parts of which are designated by the same reference numerals as in transmitter 2, but with prime designations added.

For modulating the system, there is provided in common to both transmitters 2 and 2′ a tone signal rectifier 14, a reactance modulator 16, and a 200 kc. oscillator 18. A control line 13 extending to a remote central office, not shown, supplies keyed tone signals to the rectifier 14. The signals on line 13 may be keyed in accordance with a telegraph signal. The keyed output of the 200 kc. oscillator 18 is mixed with the output of each stabilized crystal oscillator in the respective balanced modulator 6 or 6′. Obviously other types of modulation may be employed.

Portions of the outputs from both transmitters 2 and 2′ are mixed in the detector 20. The resulting audio beat frequency obtained from the detector 20 is passed by the low pass filter 22 and any amplitude variations therein are removed by the limiter 24. The output of the limiter 24 is coupled to the audio discriminator 26 which converts any frequency variations from the desired predetermined beat frequency to proportional voltage variations. The voltage output of the audio discriminator 26 operates a motor control relay 28 which controls the motor 30. The motor rotates the differential condenser 32 which is coupled to the grid circuit of each stabilized crystal oscillator 4 and 4′ and which functions to maintain the beat frequency difference between the two crystal oscillators at a constant predetermined value. Alarm 31 signals maximum allowable rotation in either direction.

A description of the operation of the system of the figure follows. Crystal oscillators 4 and 4′ are highly stable and it is assumed that both of these have substantially the same stability. The crystal oscillators 4 and 4′ have sufficient frequency stability to keep the corresponding transmitters 2 and 2′ well within their assigned frequencies so that the small variations in oscillator frequencies due to the capacitance shunted across the crystal by the differential condenser 32 will not materially affect the mean carrier frequency of the transmitters 2 and 2'.

To obtain a high degree of frequency stability and to help maintain the separation of the two transmitters 2 and 2' at a more constant value, two piezoelectric crystals 34 and 34' having approximately the same temperature coefficient and substantially the same frequency are used so that their characteristics will be similar, confining any changes in frequency of the two crystals to the same direction. The differential condenser 32 is coupled to the grid circuits of both oscillators 4 and 4'. This differential condenser 32 is constructed with a common rotor and with two independent stator sections coupled to the oscillators 4 and 4' as shown. The capacity of each stator section is shunted across the corresponding crystals 34 and 34' so as to result in a small change in the operating frequency of each crystal.

The lower electrode of each crystal 34 and 34' is connected to the third grid of its respective tube 1 or 1', while the upper electrode of each crystal is connected to the first grid of the respective tube. As previously stated, the two oscillators 4 and 4' are exactly alike, circuitwise, and circuit elements of oscillator 4' which are similar to those of oscillator 4 are designated by the same reference numerals, primed. Therefore, only one of the oscillators will be described in detail. The trimmer condenser 36 is connected directly across crystal 34, this condenser being adjustable to adjust the capacity across the crystal. A resistor 3 is connected from the first grid of tube 1 to ground. Each stator section of differential condenser 32 is connected to the upper or ungrounded end of its respective resistor 3 and thereby also to the upper electrode of its corresponding crystal 34 or 34'. The common rotor of condenser 32 is grounded. A capacitive circuit is coupled from the lower electrode of each crystal to ground, thereby to connect the capacitance of each section of condenser 32 across its respective crystal. This capacitive circuit mentioned for crystal 34 may be traced from the lower electrode of crystal 34, through a resistor 5 and a capacitor 7, to a ground terminal. Thus, the capacitance of each section of condenser 32 is connected across its respective crystal. The third grid of each of tubes 1 and 1' may be considered the anode of the respective tube. The remainder of each of the crystal oscillators 4 and 4' is more or less conventional, so will not be described further herein.

The construction is such that with a given angular change of the rotor, the capacitance of one section will increase a given amount and the capacitance of the other section will decrease the same amount, resulting in proportional changes in the oscillator frequencies, the oscillator frequencies varying in opposite directions. An alarm control 31 indicates maximum allowable rotation of the differential condenser 32 in either direction. However, the differential condenser has such range as to minimize the probability of maximum rotation.

Let it be assumed that there are two crystal oscillators generating oscillations of 1,800.000 kc. The 200 kc. oscillator frequency is added to the crystal frequency in the balanced modulator and the resultant sum frequency of 2,000.000 kc. is multiplied eight times in each of the transmitters, giving output frequencies at the antennas of 16,000.000 kc. which it is desired to hold with a fixed separation of 80 cycles±8 cycles or to within ± one part in 2,000,000. The crystals 34 and 34' are therefore differentially offset five cycles from the 1,800.000 kc. frequency by adjusting the capacity in parallel with the crystal, utilizing the frequency trimmer condensers 36 and 36'. This results in frequencies of 1,800.005 kc. and 1,799.995 kc., a ten cycle difference which when multiplied by eight in each transmitter, gives the desired 80-cycle separation. If one oscillator drifts ten cycles higher in frequency from 1,800.005 kc. to 1,800.015 kc. resulting in a difference frequency of twenty cycles, the system tends to lower the higher frequency oscillator five cycles to 1,800.010 kc. and raises the frequency of the other oscillator five cycles from 1,799.995 to 1,800.000 kc., thus tending to maintain the desired ten cycle difference.

The control line 13 carrying keyed tone modulation is coupled to the tone signal rectifier 14 which converts the tone signal input to correspondingly varied D. C. output. This voltage operates the reactance modulator 16 which shifts the frequency of the 200 kc. oscillator 18 by varying the reactance of the plate circuit of the 200 kc. oscillator in accordance with the original keying. The output of the 200 kc. oscillator 18 is combined in balanced modulator 6 with the output of the stabilized oscillator 4. The major output frequencies from the balanced modulator 6 comprise the sum and difference frequencies of the 200 kc. oscillator 18 and the stabilized oscillator 4, since the frequency of the stabilized crystal oscillator is suppressed in the balanced modulator 6; only the sum frequency of the 200 kc. and the crystal oscillator frequency in the output of the balanced modulator is then selected and passed by the sideband filter 8. The output of the sideband filter 8 is then frequency multiplied and amplified in the multiplier-amplifier 10 to give the final transmitter output which is then radiated by the antenna 12.

Transmitter 2' operates in similar manner and radiates waves at a frequency slightly different from those radiated by transmitter 2. The antennas 12 and 12' are geographically separated the necessary distance to provide for space diversity transmission.

It will be seen from the foregoing that two signals carrying the same intelligence are transmitted from the two spaced antennas. Portions of the radiated output from the two transmitters are applied to the detector 20. The output of the detector 20 containing both the sum and difference of the two frequencies is fed to a low pass filter 22 where the sum of the two frequencies is removed, the low pass filter 22 passing the audio difference frequency only. A limiter 24 coupled to the output of the low pass filter 22 eliminates any amplitude variations. The audio beat frequency signal is fed to the audio discriminator 26 which is adjusted such that any variation from the predetermined audio frequency difference will result in a voltage output whose amplitude is proportional to the amount of such variation, and whose polarity is dependent on the sense or direction of change. This voltage operates the motor control relay 28 in such manner as to control the extent and direction of rotation of the motor 30 which, in turn, controls the differential condenser 32 to stabilize the difference frequency as explained before. When the difference frequency is stabilized, the voltage output of the audio discriminator 26 will decrease, opening the relay and thus stopping the rotation of the motor 30 and differential condenser 32.

An important advantage of the invention is that it maintains the center frequency at approximately one half of the random frequency variations of the oscillators 4 and 4′, and the difference frequency to a much higher degree depending on the control sensitivity of the automatic frequency control. The reason for reducing center frequency drift is that if one oscillator drifts a given amount the system compensates that oscillator such that it is changed in frequency by an amount equal to one half the drift, the frequency of the other oscillator being changed in the reverse direction to counteract the drift. As an example let it be assumed that oscillator 4 drifts ten cycles higher in frequency from its original 1,800.005 kc. to 1,800.015 kc. Then the system lowers the frequency of oscillator 4 five cycles to 1,800.010 kc. and raises the frequency of the oscillator 4′ five cycles from its original 1,799.995 kc. to 1,800.000 kc. The frequency difference is thus returned to ten cycles and the mean frequency is increased from the original 1,800.000 kc. to 1,800.005 kc.; that is, an increase of one half of the assumed ten cycle drift of oscillator 4.

What is claimed is:

1. An automatic frequency control system for maintaining the frequency difference between two crystal oscillators constant at a predetermined value comprising two stable crystal oscillators operating at different frequencies, said crystal oscillators each having a grid circuit to which a crystal is coupled, a differential condenser having two capacities, one coupled respectively to each of the grid circuits, a detector coupled to circuits containing energy representative of the outputs of said crystal oscillators for producing a beat frequency, a limiter coupled to the output of the detector to reduce amplitude variations, an audio discriminator coupled to the output of the limiter to convert frequency variations of the beat frequency from a predetermined value to proportional voltage variations, a relay connected to the output of the audio discriminator, and a motor operated by the relay and connected to said differential condenser in such manner as to differentially vary the frequencies of the two oscillators in response to changes in the output voltage of said discriminator.

2. A diversity transmission communications system utilizing two transmitters with provision for automatically maintaining the difference frequency between the two transmitters at a constant predetermined value, comprising two stable crystal oscillators operating at different carrier frequencies, said stable crystal oscillators each having a grid circuit to which a crystal is coupled, a differential condenser having two capacities respectively coupled to different ones of the grid circuits, a source of modulating voltage, two balanced modulators each coupled respectively to a corresponding stabilized crystal oscillator to receive the corresponding carrier frequency and each coupled to said source to receive said modulating voltage and each having as an output an upper and a lower sideband frequency signal with the corresponding carrier frequency suppressed, two sideband filters each coupled respectively to the corresponding balanced modulator to receive the sideband frequency signals therefrom and to filter out one of the sidebands, passing the other, two frequency multiplier-amplifiers each coupled respectively to the corresponding sideband filter to multiply and amplify the passed frequency signal of said sideband filter, two antennas geographically separated to provide for diversity transmission each coupled respectively to the corresponding frequency multiplier-amplifier to receive and radiate the multipled and amplified signal therefrom, a detector coupled to the outputs of said frequency multiplier-amplifiers to produce a beat frequency signal, a limiter coupled to the output of the detector to reduce amplitude variations of the beat frequency signal, an audio frequency discriminator coupled to the output of the limiter to produce an output voltage proportional to frequency variations of said beat frequency signal from a predetermined frequency, a relay connected to the output of said audio discriminator, and a motor operated by the relay and connected to the differential condenser to vary said two capacities in opposite directions.

3. In a radio transmitting system, two radio frequency oscillators operating at different frequencies, separate transmitters excited by the respective oscillators for radiating energy derived from such oscillators, a modulator in each of said transmitters for modulating the outputs of each respective oscillator, means for supplying a common modulating signal to each of said modulators, means for mixing the outputs of both oscillators to produce a beat frequency, a differential condenser coupled to both oscillators to vary the frequencies thereof oppositely, and means responsive to variations of said beat frequency from a predetermined value in the audio frequency range to operate said condenser.

References Cited in the file of this patent

UNITED STATES PATENTS

| Number | Name | Date |
|---|---|---|
| 1,907,132 | Thurston | May 2, 1933 |
| 1,915,578 | Osnos | June 27, 1933 |
| 2,112,826 | Cook | Apr. 5, 1938 |
| 2,126,910 | Moseley | Aug. 16, 1938 |
| 2,240,452 | Wolfskill | Apr. 29, 1941 |
| 2,245,627 | Varian | June 17, 1941 |
| 2,377,327 | Seeley | June 5, 1945 |